US009546560B2

(12) United States Patent
Larson

(10) Patent No.: US 9,546,560 B2
(45) Date of Patent: Jan. 17, 2017

(54) COMPACT DOUBLE GROUNDED MECHANICAL CARBON SEAL

(75) Inventor: Christopher J. Larson, Newfield, ME (US)

(73) Assignee: United Technologies Corporation, Hartford, CT (US)

(*) Notice: Subject to any disclaimer, the term of this patent is extended or adjusted under 35 U.S.C. 154(b) by 670 days.

(21) Appl. No.: 13/609,843

(22) Filed: Sep. 11, 2012

(65) Prior Publication Data
US 2014/0069100 A1 Mar. 13, 2014

(51) Int. Cl.
F01D 11/00 (2006.01)
F02C 7/28 (2006.01)
F16J 15/34 (2006.01)
F16J 15/00 (2006.01)

(52) U.S. Cl.
CPC ........... F01D 11/003 (2013.01); F01D 11/005 (2013.01); F02C 7/28 (2013.01); F16J 15/002 (2013.01); F16J 15/34 (2013.01); F16J 15/344 (2013.01); F16J 15/3436 (2013.01); F16J 15/3448 (2013.01); F16J 15/3452 (2013.01); F16J 15/3464 (2013.01); F16J 15/3472 (2013.01); F05D 2240/55 (2013.01); F05D 2240/58 (2013.01); F16J 15/346 (2013.01); F16J 15/3456 (2013.01); Y02T 50/671 (2013.01)

(58) Field of Classification Search
CPC .. F01D 11/003; F01D 11/005; F05D 2240/55; F05D 2240/58; F02C 7/28; F16J 15/002; F16J 15/34; F16J 15/3436–15/3496
See application file for complete search history.

(56) References Cited

U.S. PATENT DOCUMENTS

| 4,754,984 | A | | 7/1988 | Keba | |
| 5,141,389 | A | * | 8/1992 | Bear | F01D 3/00 277/348 |
| 5,464,227 | A | | 11/1995 | Olson | |
| 6,196,790 | B1 | | 3/2001 | Sheridan et al. | |
| 6,887,038 | B2 | | 5/2005 | Cabe et al. | |
| 7,159,873 | B2 | | 1/2007 | McCutchan | |
| 8,215,894 | B2 | | 7/2012 | Miller et al. | |
| 2005/0248093 | A1 | * | 11/2005 | Keba | F16J 15/004 277/358 |
| 2007/0096398 | A1 | * | 5/2007 | Miller et al. | 277/370 |
| 2009/0121441 | A1 | * | 5/2009 | Miller et al. | 277/366 |

* cited by examiner

Primary Examiner — Gerald L Sung
Assistant Examiner — Scott Walthour
(74) Attorney, Agent, or Firm — Kinney & Lange, P.A.

(57) ABSTRACT

A disclosed intershaft seal assembly for a gas turbine engine includes a support fixed to a static structure. A first seal housing is supported radially outboard of the support for holding a first seal. A second seal housing is supported radially inboard of the support and supports a second seal. A first biasing member is provided between the support and the first seal housing that biases the first seal housing in a first direction away from the support. A second biasing member between the support and the second seal housing biases the second seal housing in a second direction away from the support.

14 Claims, 2 Drawing Sheets

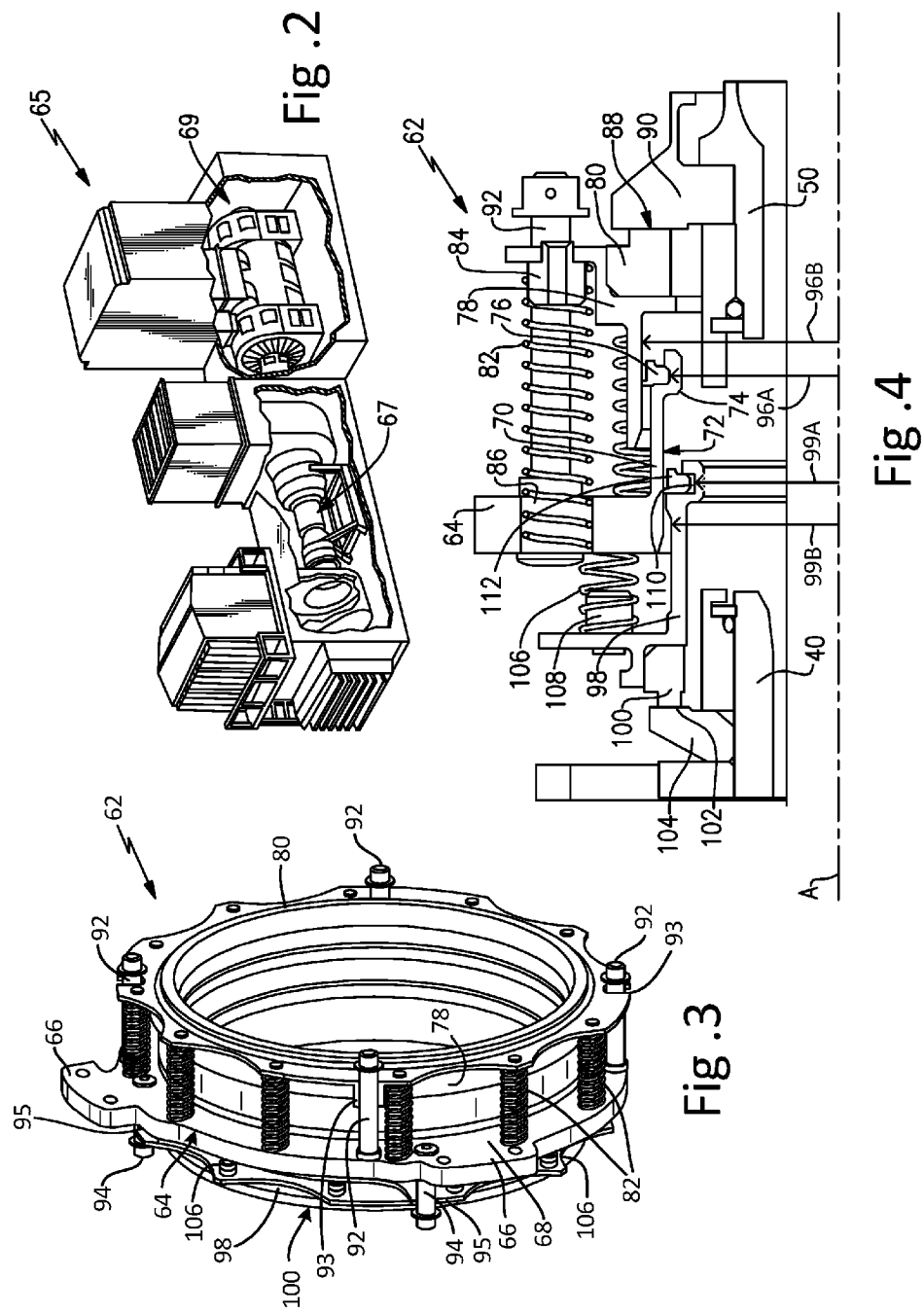

COMPACT DOUBLE GROUNDED MECHANICAL CARBON SEAL

BACKGROUND

A gas turbine engine typically includes a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

In gas turbine engines, mechanical seal assemblies are used to prevent hot, high pressure air from entering a bearing compartment that operates at a low pressure and temperature. For example, a front bearing compartment in a multiple spool gas turbine engine is filled with an oil mist to lubricate the bearings that support the high speed rotor shaft and the low speed rotor shaft. The high speed rotor shaft and the low speed rotor shaft are separated by a gap filled with working medium gas. The working medium gas cools the rotor shaft. An intershaft seal assembly is required to keep leakage between the two regions within acceptable amounts during operation.

Speed variations between shafts experienced by each face seal can result in uneven loading. Moreover, limited space is available within bearing compartments at the interface between shafts sealing between the high and low speed rotor shafts.

Accordingly, it is desirable to provide a dual configuration intershaft seal assembly for a rotational assembly having rotor shafts including different sealing requirements that reduces seal assembly design space, reduces cost and reduces the overall weight of the assembly.

SUMMARY

An intershaft seal assembly according to an exemplary embodiment of this disclosure, among other possible things includes a support fixed to a static structure, a first seal housing supported radially outboard of the support for holding a first seal, a first biasing member disposed between the support and the first seal housing biasing the first seal housing in a first direction away from the support, a second seal housing supported radially inward of the support for holding a second seal, and a second biasing member disposed between the support and the second seal housing biasing the second seal housing in a second direction away from the support.

In a further embodiment of the foregoing intershaft seal assembly, the first seal comprises an annular seal biased into contact with a first rotating seal plate.

In a further embodiment of any of the foregoing intershaft seal assemblies, the second seal comprises an annular seal biased into contact with a second rotating seal plate.

In a further embodiment of any of the foregoing intershaft seal assemblies, first biasing member comprises a first coil spring and the second biasing member comprises a second biasing member. The first biasing member extends in the first direction and the second biasing member extends in the second direction.

In a further embodiment of any of the foregoing intershaft seal assemblies, the first coil spring comprises a first plurality of first coil springs spaced circumferentially apart about the support, and the second coil spring comprises a second plurality of coil springs spaced circumferentially apart about the support.

In a further embodiment of any of the foregoing intershaft seal assemblies, the intershaft assembly further comprises a first anti-rotation pin fixed to the support and extending in the first direction through a first opening in the first housing for preventing rotation of the first seal housing relative to the support, and a second anti-rotation pin fixed to the support and extending in the second direction through a second opening in the second housing for preventing rotation of the second seal housing relative to the support.

In a further embodiment of any of the foregoing intershaft seal assemblies, the intershaft assembly further comprises a first radial seal between the first seal housing and the support having a first diameter and a second radial seal between the second seal housing and the support having a second diameter different than the first diameter.

In a further embodiment of any of the foregoing intershaft seal assemblies, the first diameter is larger than the second diameter.

In a further embodiment of any of the foregoing intershaft seal assemblies, the support comprises a plurality of flanges extending radially outward from an outer circumference.

A gas turbine engine according to an exemplary embodiment of this disclosure, among other possible things includes a compressor section including a first compressor supported for rotation on a first shaft and a second compressor supported for rotation on a second shaft, a combustor in fluid communication with the compressor section, a turbine section in fluid communication with the combustor including a first turbine driving the first compressor through the first shaft and a second turbine driving the second compressor through the second shaft, an intershaft seal disposed between the first shaft and the second shaft, the intershaft seal including a support fixed to a static structure, a first seal housing supported radially outboard of the support for holding a first seal, a first biasing member disposed between the support and the first seal housing biasing the first seal housing in a first direction away from the support, a second seal housing supported radially inward of the support for holding a second seal, and a second biasing member disposed between the support and the second seal housing biasing the second seal housing in a second direction away from the support.

In a further embodiment of the foregoing gas turbine engine, the gas turbine engine further comprises a first seal plate on the first shaft and a second seal plate on the second shaft. The first seal comprises an annular seal biased into contact with the first seal plate and the second seal comprises an annular seal biased into contact with the second seal plate.

In a further embodiment of any of the foregoing gas turbine engines, the first biasing member comprises a first plurality of first coil springs spaced circumferentially apart about the support, and the second biasing member comprises a second plurality of coil springs spaced circumferentially apart about the support.

In a further embodiment of any of the foregoing gas turbine engines, the gas turbine engine further comprises a first anti-rotation pin fixed to the support and extending in the first direction through a first opening in the first housing for preventing rotation of the first seal housing relative to the support, and a second anti-rotation pin fixed to the support and extending in the second direction through a second opening in the second housing for preventing rotation of the second seal housing relative to the support.

In a further embodiment of any of the foregoing gas turbine engines, the gas turbine engine further comprises a first radial seal between the first seal housing and the support having a first diameter and a second radial seal between the second seal housing and the support having a second diameter different than the first diameter.

A method for sealing a gap between first and second coaxial shafts of a gas turbine engine according to an exemplary embodiment of this disclosure, among other possible things includes positioning a first seal housing supporting a first seal having a first configuration adjacent a first shaft, positioning a second seal housing supporting a second seal having a second, different configuration adjacent the second shaft, and supporting the first seal housing and the second seal housing on a common support.

In a further embodiment of the foregoing method, the method further comprises biasing the first seal in a first direction away from the support with a first coil spring and biasing the second seal in a second direction away from the support with a second coil spring.

In a further embodiment of any of the foregoing methods, the method further comprises assembling a first radial seal between the first seal housing and the support having a first diameter and a second radial seal between the second seal housing and the support having a second diameter different than the first diameter.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 2 is a schematic view of an example industrial gas turbine engine.

FIG. 3 is a perspective view of an example intershaft seal.

FIG. 4 is a cross-sectional view of the example intershaft seal assembly.

DETAILED DESCRIPTION

Figure 1:
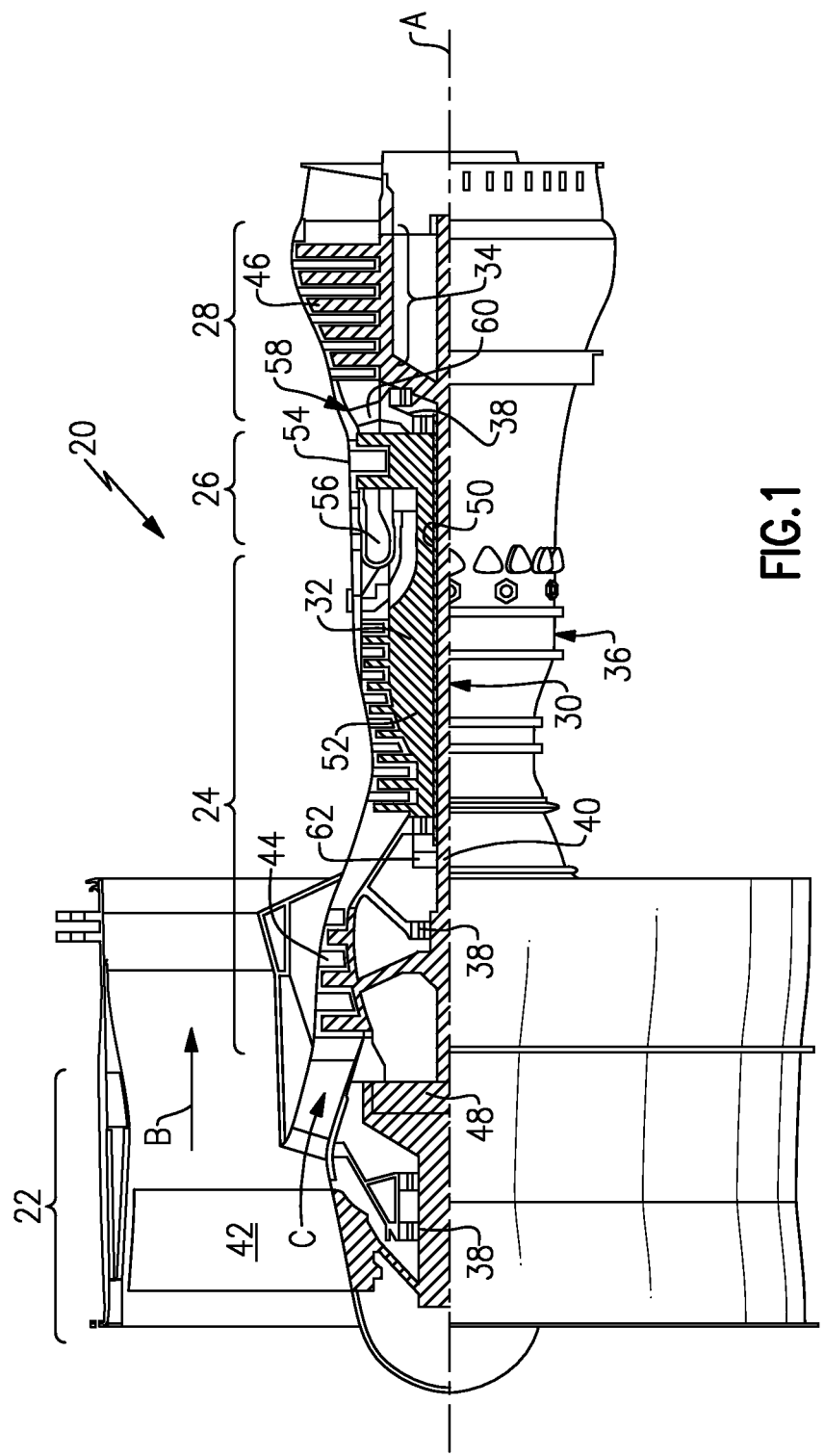
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to the combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram \ °R)/518.7]^{0.5}$]. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Referring to FIG. 2, an example industrial gas turbine engine assembly 65 includes a gas turbine engine 67 that is mounted to a structural land based frame to drive a generator 69. The example gas turbine engine 67 includes many of the same features described in the gas turbine engine 20 illustrated in FIG. 1 and operates in much the same way. The land based industrial gas turbine engine 67, however, may include additional features such as a shaft to drive the generator 69 and is not constrained by the same weight restrictions that apply to an aircraft mounted gas turbine engine. As appreciated, many of the parts that are utilized in an aircraft and land based gas turbine engine are common and therefore both aircraft based and land based gas turbine engines will benefit from this disclosure and are within the contemplation of this disclosure.

Referring back to FIG. 1, an intershaft seal 62 is provided between the outer shaft 50 and the inner shaft 40. The intershaft seal 62 maintains separation between buffer air that is circulated within the shafts 40, 50 and oil within the bearing compartments 38.

In this example, the outer shaft 50 supports rotation of the high pressure compressor section 52 and the inner shaft 40 supports rotation of the low pressure compressor section 44. Each of the shafts 40, 50 rotate at different speeds and therefore the intershaft seal 62 include features that accommodate differing speeds while maintaining the desired seal of buffer air within the shafts 40, 50.

Referring to FIGS. 3 and 4, the example intershaft seal 62 includes a support 64 that is fixed to a static structure such as the engine static structure or case 36 through flanges 66 that extend radially outward from an outer perimeter 68. The flanges include openings through which fasteners may extend such that the intershaft seal 62 can be rigidly attached to the engine static structure 36.

The support 64 defines a radially inner surface 72 and a radially outer surface 70. On the radially outer surface 70 is provided a groove 74 for a first radial seal 76. A first seal housing 78 is disposed radially outward of the support 64 and engages the first radial seal 76.

The first seal housing 78 is biased axially rearward by a first biasing member 82 such that a seal 80 is biased against a seal plate 90. The seal plate 90 is attached to the outer shaft 50 that rotates at a speed common with the high pressure compressor 52. The seal plate 90 rotates with the shaft 50 and the seal 80 maintains a fixed position relative to the rotating seal plate 90.

The first seal housing 78 includes a guide 84 that helps align the biasing member 82. In this example, the biasing member 82 is a coil spring that is supported on a first side within a recess 86 defined on the support 64 and on a second side by the guide 84 attached to the first seal housing 78. The first seal housing 78 includes a configuration that is in contact with the seal 80. In this example, the seal 80 is a carbon seal that extends annularly about the axis A and is placed in contact with the seal plate 90. The seal 80 includes a seal face 88 having a desired area corresponding with the forces required to provide the desired seal between the seal face 88 and the seal plate 90.

In certain embodiments, first anti-rotation pin 92 can be fixed to support 64, and extend in a first direction through first opening 93 in first seal housing 78 for preventing rotation of first seal housing 78 relative to support 64. Second anti-rotation pin 94 can additionally or alternatively be fixed to support 64 and extend in a second (e.g., opposing) direction through second opening 95 in second seal housing 98 for preventing rotation of second seal housing 98 relative to support 64.

A second seal housing 98 is supported radially inward of the support 64 and includes a second radial seal 112 disposed within a groove 110 defined on the second seal housing 98. The second radial seal 112 is biased into contact with the radially inward surface 72 of the support 64. In this example, the first radial seal 76 includes a diameter 96 that is greater than a second diameter 98 on which the second radial seal 112 is disposed. As appreciated, the difference in the first diameter 96 and the second diameter 98 define different pilot diameters that generate different biasing forces and loads on the corresponding seals.

The second seal housing 98 supports a second seal 100 against a second seal plate 104 that rotates with the inner shaft 40. As appreciated, the inner shaft 40 drives the low pressure compressor 44 about the axis A. The seal 100 includes a seal face 102 that is abutted and seals against the rotating second seal plate 104.

In certain embodiments, first anti-rotation pin 92 can be fixed to support 64, and extend in a first direction through first opening 93 in first seal housing 78 for preventing rotation of first seal housing 78 relative to support 64. Second anti-rotation pin 94 can additionally or alternatively be fixed to support 64 and extend in a second (e.g., opposing) direction through second opening 95 in second seal housing 98 for preventing rotation of second seal housing 98 relative to support 64.

A second biasing member 106 is disposed between the support 64 and the second seal housing 98. The second seal housing 98 supports a guide 108 that in turn guides the biasing member 106 during operation. In this example, the first biasing member 82 and the second biasing member 106 are coil springs that extend in opposite directions from the support 64. The first biasing member 82 and the second biasing member 106 are spaced circumferentially apart about the support 64 and are not coaxial.

Moreover, each of the first biasing member 82 and the second biasing member 106 define different biasing forces that exert different loads on the corresponding first seal 80 and the second seal 100. The differing speeds of the outer shaft 50 and inner shaft 40 require different sealing configurations that are provided by the example intershaft seal 62. The different sealing loads and forces are provided by the differing first and second diameters 96 and 98 along with the different biasing forces exerted by the corresponding first biasing member 82 and the second biasing member 106.

Each of the first seal 80 and the second seal 100 are grounded to the engine static structure 36 through the common support 64. Although each of the first seal 80 and second seal 100 are grounded through the common support 64, each of the first seal 80 and the second seal 100 operate and move independently to provide the desired sealing loads corresponding with the corresponding shaft speeds. Moreover, the example disclosed intershaft seal assembly 62 includes secondary radial seals 112 and 76 that are disposed at different diameters about the axis A to provide different pilot diameters that correspond with forces required for generating the desired seal of buffer air within the cavities defined by the inner and outer shafts 40, 50.

Accordingly, the example intershaft seal assembly 62 provides for different sealing between different rotating shaft assemblies within a radially and axially compact area.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A method for sealing a gap between first and second coaxial shafts of a gas turbine engine comprising the steps of:
   positioning a first seal housing supporting a first seal having a first configuration adjacent the first shaft, the first seal housing comprising a first radially-extending flange and a first axially-extending flange, the first radially-extending flange disposed radially outboard from the first axially-extending flange, with respect to a shaft axis, the first axially-extending flange disposed radially outboard from a radially inner surface of the first seal housing, and the first seal retained against the first axially-extending flange;
   positioning a second seal housing supporting a second seal having a second, configuration adjacent the second shaft, the second seal housing comprising a second radially-extending flange and a second axially-extending flange, and the second seal retained against each of the second radially-extending flange and the second axially-extending flange;
   supporting the first seal housing radially outboard of a common support defining at least a radially inner surface facing radially inwardly with respect to the shaft axis, the radially inner surface of the common support opposite a radially outer surface defined by the common support facing radially outwardly with respect to the shaft axis and positioned radially inwardly from the second axially-extending flange of the second seal housing, the common support including a body extending radially outwardly with respect to the shaft axis, and the common support further including at least one flange extending radially outwardly from an outer perimeter of the common support;
   biasing the first seal housing in a first axial direction away from the common support with at least one first biasing member disposed radially outboard from the first axially-extending flange and disposed against the body of the common support and the first radially-extending flange of the first seal housing;
   supporting the second seal housing radially inward of the common support;
   biasing the second seal housing in a second axial direction opposite the first axial direction, away from the common support, with at least one second biasing member disposed radially outboard from the second axially-extending flange of the second seal housing and against the body of the common support and the second radially-extending flange of the second seal housing;
   fixing the common support to a static structure via the at least one flange of the common support;
   assembling a first radial seal in a groove defined in the radially outer surface of the common support and in contact with the radially inner surface of the first seal housing, the radially inner surface of the first seal housing facing radially inwardly with respect to the shaft axis, the first radial seal disposed at a first inner diameter and a first outer diameter relative to the shaft axis; and
   assembling a second radial seal in a groove defined in the second seal housing and in contact with the radially inner surface of the common support, the second radial seal disposed at a second inner diameter and a second outer diameter relative to the shaft axis;
   wherein the second inner diameter is different from the first inner diameter; or the second outer diameter is different from the first outer diameter.

2. The method as recited in claim 1, wherein the at least one first biasing member comprises a first coil spring, and the at least one second biasing member comprises a second coil spring.

3. The method as recited in claim 2, wherein the the at least one first biasing member comprises a first plurality of first coil springs spaced circumferentially apart about the common support, and the at least one second biasing member comprises a second plurality of second coil springs spaced circumferentially apart about the common support, the first plurality of first coil springs circumferentially offset from the second plurality of second coil springs.

4. An intershaft seal assembly comprising:
   a common support defining at least a radially inner surface facing radially inwardly with respect to an axis, the radially inner surface opposite a radially outer surface facing radially outwardly with respect to the axis, the common support including a body extending radially outwardly with respect to the axis, the common support further including at least one flange extending radially outwardly from an outer perimeter of the common support, the common support being fixed to a static structure via at least one flange;

a first seal housing supported radially outboard of the common support, the first seal housing comprising a first radially-extending flange and a first axially-extending flange, the first radially-extending flange disposed radially outboard from the first axially-extending flange, with respect to the axis, the first axially-extending flange disposed radially outboard from a radially inner surface of the first seal housing, and a first seal retained against the first axially-extending flange;

at least one first biasing member disposed radially outboard from the first axially-extending flange of the first seal housing and disposed against the body of the common support and the first radially-extending flange of the first seal housing and biasing the first seal housing in a first axial direction away from the common support;

a second seal housing supported radially inward of the common support, the second seal housing comprising a second radially-extending flange and a second axially-extending flange, the second axially-extending flange disposed radially outboard from the radially outer surface of the common support, with respect to the axis, and a second seal retained against each of the second radially-extending flange and the second axially-extending flange;

at least one second biasing member disposed radially outboard from the second axially-extending flange of the second seal housing and disposed against the body of the common support and the second radially-extending flange of the second seal housing and biasing the second seal housing in a second axial direction opposite the first axial direction, away from the common support;

a first radial seal disposed in a groove defined in the radially outer surface of the common support and in contact with the radially inner surface of the first seal housing, the radially inner surface of the first seal housing facing radially inwardly with respect to the axis, the first radial seal disposed at a first inner diameter and a first outer diameter relative to the axis; and a second radial seal disposed in a groove defined in the second seal housing and in contact with the radially inner surface of the common support, the second radial seal disposed at a second inner diameter and a second outer diameter relative to the axis;

wherein the second inner diameter is different from the first inner diameter; or the second outer diameter is different from the first outer diameter.

5. The intershaft seal assembly as recited in claim 4, wherein the first seal comprises an annular seal biased into contact with an associated first rotating seal plate.

6. The intershaft seal assembly as recited in claim 4, wherein the second seal comprises an annular seal biased into contact with an associated second rotating seal plate.

7. The intershaft seal assembly as recited in claim 4, wherein the at least one first biasing member comprises a first coil spring and the at least one second biasing member comprises a second coil spring, wherein the at least one first biasing member extends in the first axial direction and the at least one second biasing member extends in the second axial direction.

8. The intershaft seal assembly as recited in claim 7, wherein the at least one first biasing member comprises a first plurality of first coil springs spaced circumferentially apart about the common support, and the at least one second biasing member comprises a second plurality of second coil springs spaced circumferentially apart about the common support, the first plurality of first coil springs circumferentially offset from the second plurality of second coil springs.

9. The intershaft seal assembly as recited in claim 4, further comprising a first anti-rotation pin fixed to the common support and extending in the first axial direction through a first opening in the first seal housing for preventing rotation of the first seal housing relative to the common support, and a second anti-rotation pin fixed to the common support and extending in the second axial direction through a second opening in the second seal housing for preventing rotation of the second seal housing relative to the common support.

10. The intershaft seal assembly as recited in claim 4, wherein the first inner diameter is larger than the second inner diameter.

11. A gas turbine engine comprising:

a compressor section including a first compressor supported for rotation on a first shaft and a second compressor supported for rotation on a second shaft;

a combustor in fluid communication with the compressor section;

a turbine section in fluid communication with the combustor including a first turbine driving the first compressor through the first shaft and a second turbine driving the second compressor through the second shaft;

an intershaft seal assembly disposed between the first shaft and the second shaft, the intershaft seal assembly comprising:

a common support defining at least a radially inner surface facing radially inwardly with respect to a shaft axis, the radially inner surface opposite a radially outer surface facing radially outwardly with respect to the shaft axis, the common support including a body extending radially outwardly with respect to the shaft axis, the common support further including at least one flange extending radially outwardly from an outer perimeter of the common support, the common support being fixed to a static structure via the at least one flange;

a first seal housing supported radially outboard of the common support, the first seal housing comprising a first radially-extending flange and a first axially-extending flange, the first radially-extending flange disposed radially outboard from the first axially-extending flange, with respect to the shaft axis, the first axially-extending flange disposed radially outboard from a radially inner surface of the first seal housing, and a first seal retained against the first axially-extending flange and adjacent the first shaft;

at least one first biasing member disposed radially outboard from the first axially-extending flange of the first seal housing and disposed against the body of the common support and the first radially-extending flange of the first seal housing and biasing the first seal housing in a first axial direction away from the common support;

a second seal housing supported radially inward of the common support, the second seal housing comprising a second radially-extending flange and a second axially-extending flange, the second axially-extending flange disposed radially outboard from the radially outer surface of the common support, with respect to the shaft axis, and a second seal retained against each of the second radially-extending flange and the second axially-extending flange and adjacent the second shaft;

at least one second biasing member disposed radially outboard from the second axially-extending flange of the second seal housing and disposed against the body of the common support and the second radially-extending flange of the second seal housing and biasing the second seal housing in a second axial direction opposite the first axial direction, away from the common support;

a first radial seal disposed in a groove defined in the radially outer surface of the common support and in contact with the radially inner surface of the first seal housing, the radially inner surface of the first seal housing facing radially inwardly with respect to the shaft axis, the first radial seal disposed at a first inner diameter and a first outer diameter relative to the shaft axis; and a second radial seal disposed in a groove defined in the second seal housing and in contact with the radially inner surface of the common support, the second radial seal disposed at a second inner diameter and a second outer diameter relative to the shaft axis; wherein:

the second inner diameter is different from the first inner diameter; or the second outer diameter is different from the first outer diameter.

12. The gas turbine engine as recited in claim 11, further comprising a first seal plate on the first shaft and a second seal plate on the second shaft wherein the first seal comprises a first annular seal biased into contact with the first seal plate and the second seal comprises a second annular seal biased into contact with the second seal plate.

13. The gas turbine engine as recited in claim 11, wherein the at least one first biasing member comprises a first plurality of first coil springs spaced circumferentially apart about the support, and the at least one second biasing member comprises a second plurality of second coil springs spaced circumferentially apart about the support, the first plurality of first coil springs circumferentially offset from the second plurality of second coil springs.

14. The gas turbine engine as recited in claim 11, further comprising a first anti-rotation pin fixed to the common support and extending in the first axial direction through a first opening in the first seal housing for preventing rotation of the first seal housing relative to the common support, and a second anti-rotation pin fixed to the common support and extending in the second axial direction through a second opening in the second seal housing for preventing rotation of the second seal housing relative to the common support.

* * * * *